United States Patent
Coulter et al.

[15] 3,686,486
[45] Aug. 22, 1972

[54] APPARATUS FOR OBTAINING STATISTICAL HEMATOLOGICAL INDICES AND ANALYZING SAME AND METHOD

[72] Inventors: Wallace H. Coulter, Miami Springs; Walter R. Hogg, Miami Lakes, both of Fla.

[73] Assignee: Coulter Electronics, Inc., Hialeah, Fla.

[22] Filed: Dec. 2, 1970

[21] Appl. No.: 94,426

[52] U.S. Cl. ............235/151.3, 128/2, 235/92 PC, 235/92 DM, 235/193, 324/71 CP
[51] Int. Cl. ..................G06g 7/12, G01n 27/00
[58] Field of Search......235/151.3, 151.31, 184, 193, 235/195, 196, 92 PC, 92 QC; 128/2 L, 2 G; 324/71 CP; 356/39, 40, 41

[56] References Cited

UNITED STATES PATENTS

| | | | |
|---|---|---|---|
| 3,100,097 | 8/1963 | Woltersdorf | 235/196 X |
| 2,960,268 | 11/1960 | Chope et al. | 235/184 X |
| 3,250,987 | 5/1966 | Okada et al. | 128/2 G |
| 3,269,172 | 8/1966 | McGaughey | 324/71 CP |
| 3,439,267 | 4/1969 | Coulter et al. | 324/71 CP |
| 3,444,463 | 5/1969 | Coulter et al. | 324/71 CP |
| 3,492,396 | 1/1970 | Dalton et al. | 356/39 X |

OTHER PUBLICATIONS

Brecher et al.: Evaluation of Electrouic Red Blood Cell Counter. American Journal of Clinical Pathology Vol. 26, No. 12, December 1956.

*Primary Examiner*—Felix D. Gruber
*Attorney*—Silverman & Cass

[57] ABSTRACT

Apparatus which receives a train of electrical pulses from a particle analyzing device such as one which is operated in accordance with the Coulter principle, derives statistical hematological indices from such train of pulses, stores the same in suitable storage means, receives a second train of pulses and derives the same indices from the second train of pulses, and compares the two indices. A readout device provides the comparison information. In this manner indices from normal blood may be obtained and thereafter the same indices from unknown blood may be obtained and compared with the normal indices for diagnosis of pathology.

21 Claims, 1 Drawing Figure

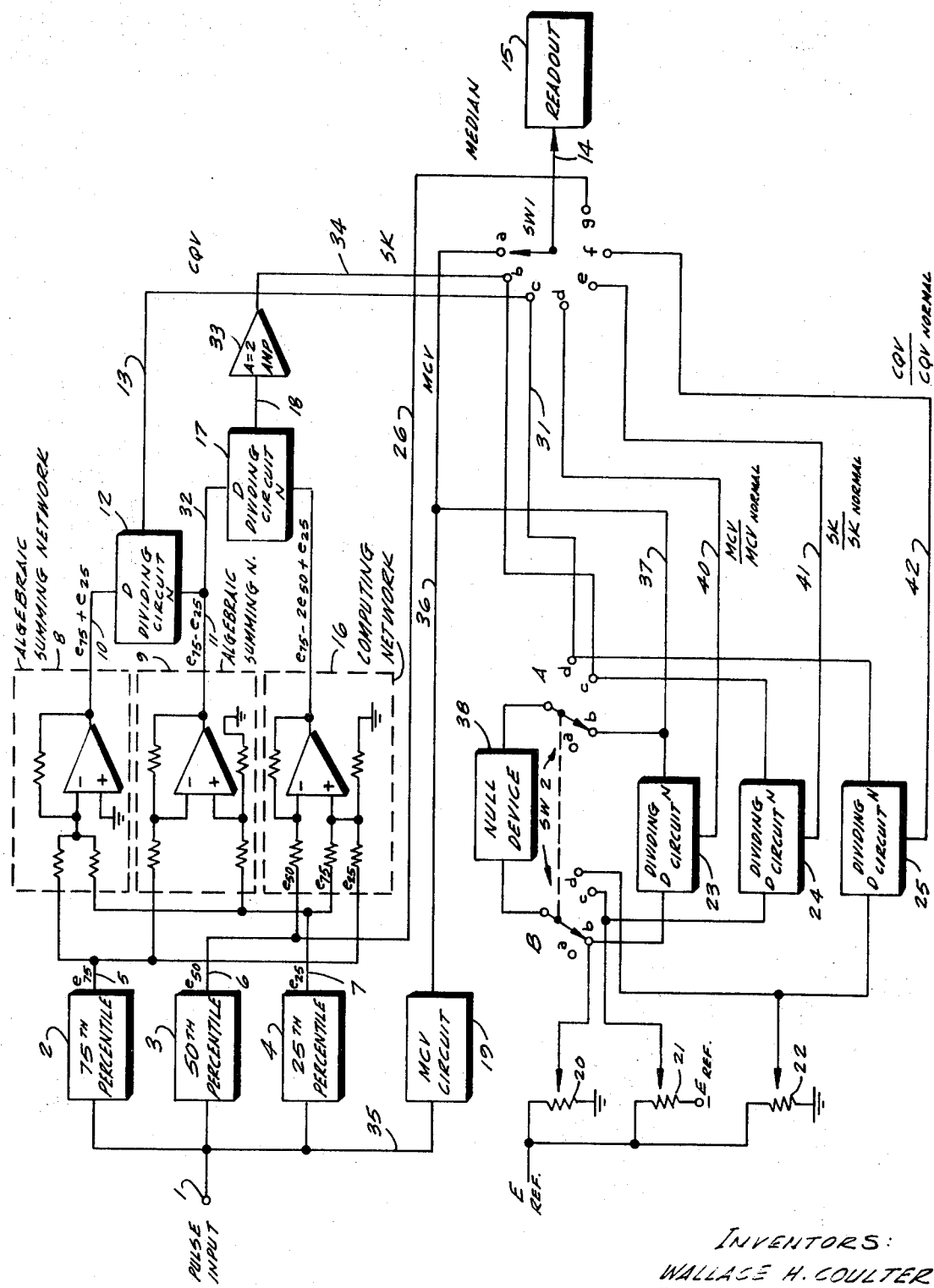

APPARATUS FOR OBTAINING STATISTICAL HEMATOLOGICAL INDICES AND ANALYZING SAME AND METHOD

CROSS REFERENCE TO RELATED PATENT

The invention herein partly concerns the use of percentile circuits, one type of which is disclosed in applicants' U.S. Pat. No. 3,557,352; which, to the extent that it may become necessary, may be incorporated herein by reference.

BACKGROUND OF THE INVENTION

In medicine, the occurrence of abnormal statistical indices in a patient's blood may point to pathology, may assist in diagnosis of disease and may be an indication of the effectiveness of treatment. Apparatuses exist which enable the determination of many indices, such apparatuses including the electronic analyzing device which operates in accordance with the Coulter principle. The Coulter apparatus has in recent years relieved the tedium of producing the so-called Price-Jones curve of the size distribution of blood cells, but nonetheless there have been two primary problems in connection with the use of the Coulter apparatus, both of which are solved by the invention herein.

The first problem, and probably the most important one is that even when the statistical curves are accurately worked out, there may be variations in the curves resulting from different conditions of use of the instrument. For example variations in the size of the aperture used with the Coulter apparatus, the ratio of length of aperture to diameter of aperture, the aperture current, gain in the electronic amplifiers and so on may influence the size distribution information received.

The second problem is that even when size distribution curves are worked out by means of the Coulter apparatus, it is necessary to make measurements on a graph to obtain statistical indices. For example, the sharpness of the bell-shaped distribution curve is indicated by an index known as the coefficient of quartile variation (C.Q.V.) and the symmetry of the curve is indicated by the coefficient of skewness (S.K.).

The first problem is solved by measuring the indices of a normal blood sample in the apparatus and storing this information, after which the unknown blood sample is measured and a comparison made. This eliminates all possible variants due to the apparatus which produces the particle pulses, enabling a true comparison to be made.

The second problem is solved by the provision of electrical means which derive the C.Q.V. and the S.K. from particle pulses produced in a particle analyzing device and applied to the apparatus.

SUMMARY OF THE INVENTION

According to the invention, means are provided which accept the particle pulses from a prior source of the same, and electrically compute the indices C.Q.V. and S.K.. Other indices may simultaneously be obtained, such as the mean cell volume (M.C.V.). All of the indices are stored in suitable storage devices such as for example the sliders of potentiometers manually adjusted index by index.

The first blood sample which is processed by the apparatus is chosen to be normal blood. The derived indices are stored. Thereafter the unknown sample is processed through the apparatus and the indices thereof obtained. The apparatus compares these second derived ones with the ones derived at first from a normal sample. From these comparisons, the operator is able to ascertain whether there is a variation from the normal and if so to what extent.

BRIEF DESCRIPTION OF THE DRAWING

The single FIGURE is a block diagram of apparatus constructed in accordance with the invention for obtaining three statistical hematological indices and making comparisons between successive hematological samples.

DESCRIPTION OF THE PREFERRED EMBODIMENT

The block diagram illustrates one manner of carrying out the invention in which the indices which are obtained from normal blood are related to the size distribution of the blood cells, and these indices are compared with the equivalent indices from suspected blood, a ratio being automatically obtained and made available to the operator for diagnosis. The three indices in this case comprise the coefficient of quartile variation (C.Q.V.), the coefficient of skewness (S.K.) and the mean cell volume (M.C.V.).

The first two of these indices are obtained by circuitry which is described in detail, and the third index is obtained by means of the M.C.V. circuit 19, which is constructed in accordance with U.S. Pat. No. 3,473,010.

The input terminal 1 receives pulses from some form of particle analyzing device (not shown) which produces electrical pulses whose amplitudes are respectively proportional to the particles producing the same. For example, such a particle analyzing device could be the electronic apparatus which operates in accordance with the Coulter principle described in U.S. Pat. No. 2,656,508. Since the principal information relates to size distribution, the pulses from the Coulter apparatus may have had their quality improved through the use of some intervening apparatus which discards irregular pulses.

The incoming pulses are applied to three percentile discriminating circuits 2, 3 and 4. The circuit 2 which is designated 75th percentile has an output voltage $e_{75}$ on the line 5 which is proportional to the number of pulses in the 75th size quartile. In other words, three quarters of all pulses received are smaller and one quarter of all pulses received are larger. In the same manner the 50th percentile and the 25th percentile voltages $e_{50}$ and $e_{25}$ are derived for the pulses received. The 50th percentile of course represents the median, which in a normal distribution curve represents the peak of the bell-shaped curve, since all red blood cells of a normal blood sample are very closely equal in size and will produce substantially equal size pulses. There will be more of these than any variations therefrom.

The voltages on the lines 5 and 7 are applied to the algebraic summing networks 8 and 9. The upper one 8 adds the voltages $e_{75}$ and $e_{25}$ and the lower one 9 subtracts these voltages. These two derived values appear on the lines 10 and 11 and are applied to the dividing circuit 12, the sum being applied to the denominator input and the difference being applied to the numerator input. The output from the dividing circuit is a d.c. voltage proportional to the index C.Q.V.

Reference may be had to *Elementary Statistics*, 2nd Edition, by John E. Freund, Prentice Hall, Englewood Cliffs, N.J. (1965) which gives this index the symbol $V_q$. The formula for the index is given as (on page 96 of the volume)

$$(Q3 - Q1./Q3 + Q1) \cdot 100 = V_q \quad (1)$$

where
$V_q$ is the coefficient of quartile variation (C.Q.V.) in percent,
$Q3$ is the 75th percentile in any suitable units
$Q1$ is the 25th percentile in any suitable units.

It should be understood that quartile refers to the three dividing sizes at 25, 50 and 75 percent for a statistical system, in this case, particles.

The output of the dividing circuit 12 appearing on the path 13 is a voltage which also appears at the terminal c of the right hand switch SW1 and also is applied by way of the line 31 to the terminal d of the right hand section A of the switch SW2. When the arm of the switch SW1 is on the terminal c, the input 14 of the readout device 15 is connected to receive the voltage which represents the C.Q.V. index. This index will be read out for any sample which has been processed by apparatus (not shown) connected to the terminal 1.

The index S.K., as mentioned above, is the coefficient of skewness and it defines the symmetry or lack thereof for a particle size distribution, represented for example by the well-known bell-shaped curve. Reference may be had to *An Outline of Statistical Methods* 4th Edition, by Arkin & Colton, College Outline Series, Barnes & Noble, Inc. New York, N.Y. (1949). The formula for skewness coefficient is on page 41 of the volume and is defined as $$S.K. = (Q3 - \text{median}) - (\text{median} - Q1)/QD \quad (2)$$

When
$S.K.$ is the skewness coefficient,
$Q3$ is the 75th percentile
median is the 50th percentile
$Q1$ is the 25th percentile, and
$QD$ is the distance between the 25th and 75th percentiles divided by 2 or $$Q3 - Q1/2$$

or $$S.K. = 2 (Q_{75} - 2Q_{50} + Q_{25}/Q_{75} - Q_{25}) \quad (3).$$

The operation of formula (3) above may be performed by the use of an operational amplifier and resistors. These are shown in the block 16 designated computing network. The operation of this circuit is described in *Application Manual for Operational Amplifiers* published by Philbrick/Nexus Research, a Teledyne Company, Dedham, Mass. 02026. The block 16 performs the required addition of 25th and 75th percentile and the subtraction of twice the 50th percentile.

The denominator of the formula (3) has already been accomplished by the algebraic summing network 9 and hence this value is derived by way of the line 32 and is applied to the denominator input of the dividing circuit 17. The numerator input is obtained directly from the computing network 16. The output at 18 is equal to all of the right hand factor of formula (3) but not including the factor 2, and so this latter factor is applied by means of the amplifier 33 which has a gain of 2. The output of the amplifier 33 on the line 34 therefore comprises the coefficient of skewness based upon the positions of the quartiles. It is applied both to the terminal b of the switch SW1 and the terminal c of the right hand section A of the switch SW2. If the arm of the switch SW1 is rotated to contact the terminal b, a voltage equivalent to the coefficient of skewness S.K. may be read out on the readout device 15.

As noted previously, the particle pulses appearing at the terminal 1 are also applied by way of the line 35 to the MCV computer 19 and thence by way of the line 36 to the terminal a of the switch SW1. A branch of this line 37 leads to the terminal b of the right hand section A of the switch SW2. When the arm of the switch SW1 is rotated to the terminal a, the M.C.V. may be read out by the readout device 15. This is a d.c. voltage like the rest of the indices.

As thus far described, the apparatus will obtain the three indices which have been described, namely C.Q.V., S.K. and M.C.V. These values may be read out, regardless of the nature of the sample of blood which produced them. It is desired, as explained above, to store the values of the indices of normal blood in the apparatus so that the operator may make a comparison between the normal and some unknown sample or samples.

This can be accomplished by means of the storage devices which comprise in this case the potentiometers 20, 21 and 22. Each of the potentiometers is connected at its upper end to a positive reference voltage source $+E_{ref}$. The potentiometers 20 and 22 have their lower ends connected to ground because the indices which each of these will store will always be positive. The potentiometer 21 has its lower end connected to a negative reference voltage source $-E_{ref}$, since this potentiometer will be storing the coefficient of skewness which could be a negative value or zero.

These potentiometers 20, 21 and 22 have their slider arms connected respectively to the terminals b, c and d of the left hand section B of the switch SW2. The movable arms of the switch SW2 are ganged and have a null device 38 connected across the same. The null device can be any suitable balancing meter or circuit which enables one to ascertain when the voltage inputs to its two terminals balance. Thus, by movement of the sliders of the potentiometers, one may set these sliders to store voltages in the potentiometers which represent the several indices. Terminals b of the switch SW2 cooperate with the potentiometer 20 to store a voltage representative of the M.C.V.; terminals c of the switch SW2 cooperate with the potentiometer 21 to store a voltage representative of the S.K.; and terminals d of the switch SW2 cooperate with the potentiometer 22 to store a voltage representative of the index C.Q.V. In each case the operator rotates the arms of the switch SW2 to the particular position and adjusts the slider of the involved potentiometer until there is a balance or a null.

The above procedure is followed using a sample of normal blood, storing the indices in the potentiometers. After this has been done, the unknown blood sample is used to derive the particle pulses which are applied to the terminal 1. New values of the three indices are obtained. These new values appear at the terminals a, b, and c of the switch SW1. The arms of the switch SW2 in the meantime could have been moved to a zero position to the terminals a. It will be noted that there are three dividing circuits 23, 24 and 25 connected across each pair of terminals b, c and d, respectively of the switch SW2. The stored values of the indices are connected to the denominator inputs of the respective dividing circuits 23, 24 and 25, while the new values of the indices are connected to the respective numerator inputs. The dividing circuits therefore perform the operation of division, and their outputs 40, 41 and 42 give the ratios of the two indices in each case. The circuit 23 has its output line 40 connected to the terminal d of the switch SW1 and hence the ratio of MCV/MCV$_{normal}$ is available at the terminal d and may be read out when the arm of the switch SW1 is rotated to this terminal. Likewise, the line 41 is connected to the terminal e of the switch SW1 and the line 42 is connected to the terminal f of the switch SW1. When the arm is at these terminals, the ratios of the unknown to the normal indices of the S.K. and the C.Q.V. respectively may be read out in the readout device 15.

The operator may turn the arm of the switch SW1 to terminal b and ascertain whether the index S.K. is positive (skewed to the right) or negative (skewed to the left). When the value of MCV/MCV$_{normal}$ is greater or less than unity, the cell size of the unknown blood is abnormal. If CQV/CQV$_{normal}$ is greater than unity it will mean that the distribution of the cells in the unknown blood is broader than normal, and if less than unity it will mean that the distribution is narrower than normal. It is seen that the median cell size can be readily ascertained by means of the lead 26 extending from the output 6 to the switch terminal g of the switch SW1 from whence it can be read out when desired.

The measure of median cell size with respect to the M.C.V. is another measure of skewness. If there is no skewness, as occurs in normal blood, there is no difference between the median and the mean. If the median is greater than the mean, the distribution is skewed to the left, whereas if the median is smaller than the mean, then the distribution is skewed to the right.

Often the physician wishes to know the mode or most frequent size of blood cell, a simple calculation can provide this using the formula $$\text{Mode} = (\text{approx}) \; 3 \times \text{Median} - 2 \times \text{mean} \quad (4)$$

Reference may be had to page 102 of Freund, Op. cit.

Considerable variation can be made in the apparatus and its details without departing from the spirit or scope of the invention as defined in the appended claims. For example, the analog components may be replaced by digital components giving the same satisfactory results. The potentiometers 20, 21 and 22 could be automatically set by digital apparatus, thus obviating the need for manual adjustment. The operator could provide a normal sample of blood to the prior apparatus, operate some suitable energizing means and have a programming device carry out the adjustments needed to store the normal indices in the potentiometers 20, 21 and 22 or their equivalents.

What it is desired to secure by Letters Patent of the United States is:

1. A method of analyzing an unknown sample of blood which comprises the steps of: measuring by electrical means a sample of normal blood and thereby deriving a statistical hematological index of that sample of normal blood, storing a first electrical quantity representative of this index, measuring by the same electrical means an unknown blood sample and thereby deriving the same hematological index for the unknown blood, obtaining second electrical quantity representative of the latter index, and comparing the two electrical quantities by division.

2. The method as claimed in claim 1 in which a plurality of different hematological indices are measured for each sample.

3. The method as claimed in claim 1 in which the index is S.K. and said steps of deriving the index of both samples include steps for deriving the S.K. index by electrically obtaining the factors for and thereupon electrically solving the formula:

$$S.K. = 2 \, (Q_{75} - 2Q_{50} + Q_{25}/Q_{75} - Q_{25}).$$

4. The method as claimed in claim 1 in which the index is C.Q.V. and said steps of deriving the index of both samples includes the steps for deriving the C.Q.V. index by electrically obtaining the factors for and thereupon electrically solving the formula:

$$C.Q.V. = (Q_{75} - Q_{25}/Q_{75} + Q_{25}) \cdot 100$$

5. The method as claimed in claim 1 in which the index is M.C.V. and said steps of deriving the index of both samples includes the step of deriving the M.C.V. index by electrically obtaining the factors for and thereupon electrically solving the value of M.C.V.

6. The method as claimed in claim 1 in which said step of storing the first derived electrical quantity includes the steps of applying that quantity to null circuit means, which also receives a signal output level from potentiometer means, and setting the signal output level to a storage value position of the potentiometer means which balances the null circuit means, such storage value thereby representing the first derived electrical quantity.

7. The method as claimed in claim 2 in which the indices include at least two of C.Q.V., S.K. and M.C.V. and the steps of deriving the index of both samples include the steps of deriving at least two of the C.Q.V., S.K. and M.C.V. indices by electrically obtaining formula factors for said indicies and thereupon electrically solving the formulas thereof.

8. Apparatus for obtaining the C.Q.V. of blood from a sample of blood which has been passed through a device which provides a source of electrical pulses respectively having amplitudes substantially proportional to the blood cells producing the same, comprising A. a 75th percentile producing circuit having an input for receiving the blood cell representing pulses and an output, B. a 25th percentile producing circuit having an input for receiving the blood cell representing pulses and an output, C. algebraic summing network means connected to the outputs of said circuits for providing a voltage representing the sum and difference of the respective outputs of the circuits, and D. a dividing circuit for dividing the difference by the sum to obtain an output voltage proportional to the C.Q.V.

9. The apparatus as claimed in claim 8 further including means are provided for storing the output voltage, and means for comparing a subsequently obtained C.Q.V. voltage with the one stored.

10. The apparatus as claimed in claim 9 in which said means for comparing includes a second dividing circuit connected to said storing means and to said first-mentioned dividing circuit and having an output proportional to the ratio between the two C.Q.V. voltages.

11. The apparatus as claimed in claim 9 in which said means for storing includes potentiometer means, and null circuit means interposed between said dividing circuit and said potentiometer means, whereby setting said potentiometer means to a storage value position equal to the proportional output voltage will balance said null circuit means.

12. Apparatus for analysis of statistical hematological indices which comprises:
  A. means for obtaining particle pulses related to a first blood sample, said pulses having amplitudes proportional respectively to the sizes of the particles which produced the same,
  B. means connected to said obtaining means for deriving electrically from the particle pulses a plurality of statistical indices from said particles,
  C. means coupled to said deriving means for storing each of said indices, and
  D. means coupled to both said storing means and said deriving means for comparing said stored indices respectively with like indices obtained by way of said deriving means and related to another blood sample.

13. The apparatus as claimed in claim 12 in which said comparing means comprise dividing circuit means providing ratio outputs.

14. The apparatus as claimed in claim 12 in which said indices include C.Q.V. and said deriving means includes electrical means for deriving the C.Q.V. index.

15. The apparatus as claimed in claim 12 in which said indices include M.C.V. and said deriving means includes electrical means for deriving the C.Q.V. index.

16. The apparatus as claimed in claim 12 in which said indices include S.K. and said deriving means includes electrical means for deriving the C.Q.V. index.

17. The apparatus as claimed in claim 12 in which said means for storing includes potentiometer means, and null circuit means interposed between said deriving means and said potentiometer means, whereby setting said potentiometer means to a storage value position equal to a derived index will balance said null circuit means.

18. Apparatus for obtaining the S.K. index of blood from a sample of blood which has been passed through a device which provides a source of electrical pulses respectively having amplitudes substantially proportional to the blood cells producing the same which comprises:
  A. 25th, 50th and 75th percentile producing circuits having a common input for receiving the blood cell representing electrical pulses and separate outputs,
  B. a computer circuit performing the operation of adding the outputs of the 25th and 75th percentile circuits and subtracting twice the output of the 50th percentile circuit,
  C. an algebraic summing circuit having an output equal to the difference between the outputs of the 25th and 75th percentile circuits,
  D. means for dividing the computer circuit output by the algebraic summing circuit output and multiplying the same by two to obtain a signal proportional to the S.K. index.

19. The apparatus as claimed in claim 18 further including means for storing the last-mentioned signal, and means for comparing the stored signal with a S.K. index signal obtained by said apparatus according to claim 15, but from another sample of blood.

20. The apparatus as claimed in claim 19 in which said means for comparing includes a dividing circuit connected to said storing means and to said dividing and multiplying means and having an output proportional to the ratio between the two S.K. signals.

21. The apparatus as claimed in claim 19 in which said means for storing includes potentiometer means, and null circuit means interposed between said dividing and multiplying means and said potentiometer means, whereby setting said potentiometer means to a storage value position equal to the index proportional signal will balance said null circuit means.

* * * * *